United States Patent [19]

Patel

[11] Patent Number: 5,586,057
[45] Date of Patent: Dec. 17, 1996

[54] INDUSTRIAL EQUIPMENT OPERATING STATUS SCANNER

[76] Inventor: Baldev Patel, 2522 Pollard Drive, Mississauga, Ontario, Canada, L5C 3H1

[21] Appl. No.: 317,342

[22] Filed: Oct. 4, 1994

[30] Foreign Application Priority Data

Oct. 4, 1993 [GB] United Kingdom .................. 9320381

[51] Int. Cl.$^6$ .................................................. G08B 21/00
[52] U.S. Cl. .................. 364/551.01; 340/652; 340/679; 364/550
[58] Field of Search .......................... 324/522; 340/652, 340/653, 679; 364/550, 551.01, 551.02

[56] References Cited

U.S. PATENT DOCUMENTS

| | | | |
|---|---|---|---|
| 2,883,651 | 4/1959 | Akerlund | 364/550 X |
| 3,045,221 | 7/1962 | Roop | 364/550 X |
| 3,142,820 | 7/1964 | Daniels | 364/550 X |
| 3,184,725 | 5/1965 | Siegel et al. | 340/679 X |
| 3,278,920 | 10/1966 | Sargent et al. | 364/550.01 X |
| 3,309,678 | 3/1967 | Sargent et al. | 364/551.01 X |
| 3,324,458 | 6/1967 | MacArthur | 364/551.01 X |
| 4,833,592 | 5/1989 | Yamanka | 364/138 |
| 5,155,693 | 10/1992 | Altmayer et al. | 364/550 |
| 5,227,984 | 7/1993 | Meldrum et al. | 364/550 |
| 5,305,055 | 4/1994 | Ebner et al. | 355/200 |
| 5,371,487 | 12/1994 | Hoffman et al. | 340/425.5 |
| 5,414,949 | 5/1995 | Aikens et al. | 355/202 |
| 5,453,939 | 9/1995 | Hoffman et al. | 364/551.01 |
| 5,487,148 | 1/1996 | Komori et al. | 395/182.02 |

*Primary Examiner*—Edward R. Cosimano
*Attorney, Agent, or Firm*—Sim & McBurney

[57] ABSTRACT

An industrial equipment operating status scanner for recording the location and exact time of all switch/contact openings in an industrial machine or process. The scanner of the present invention also provides an indication as to whether the fault was intermittent or continuous. Thus, system fault diagnosis is made simple and reliable, resulting in less down time and less loss of revenue to the owner of the industrial machine(s) or process. The scanner provides an indication firstly of whether or not the machine is operational, secondly, in the event of an intermittent problem, the scanner displays which input device is faulty, and thirdly, in the event that operation of the machine has been stopped, the scanner displays which input device caused it to stop. In addition to the foregoing, the scanner displays also which input is preventing the machine from starting again. The time and date of the fault is also displayed by the scanner of the present invention. Thus, the scanner provides monitoring of the status of a machine's circuits and diagnoses any faults. It also records the machine's running time as well as the down time.

7 Claims, 13 Drawing Sheets

INDUSTRIAL EQUIPMENT OPERATING STATUS SCANNER

FIELD OF THE INVENTION

This invention relates in general to fault detection systems in industrial machines and processes, and more particularly to an industrial equipment operating status scanner for detecting and recording both continuous and intermittent faults.

BACKGROUND OF THE INVENTION

A common problem in industry occurs when a complex industrial machine (eg. furnace, boiler, etc.) or process having a plurality of series connected relay contacts and switches ceases operation as a result of an intermittent fault. Typically a loose wire or faulty connection in the machine(s) or process causes a contact to temporarily open and close. The opening and closing of the contact often causes a secondary relay such as a safety check relay to trip thereby halting the operation of the machine. Since the original contact fault is only on an intermittent basis, operating or maintenance personnel are required to conduct an extensive check of the machine(s) or process in an effort to determine the cause of the shut-down, prior to re-starting the system. This can result in significant down time and loss of revenue.

While the operating or maintenance personnel are analyzing the machine(s) or process to determine the cause of shut-down, many machine cabinet doors are opened and closed to gain access to various machine components. Such doors are often themselves connected to safety switches. The activation of these additional safety switches can result in additional confusion on the part of maintenance or operating personnel when two or more of such persons are investigating a system simultaneously to determine the source of the shut-down.

Prior art systems are available in the form of warning lights which indicate to a machine operator when a fault or shut-down has occurred. However, the activation of such lights or lamps is also on an intermittent basis so that only switches or contacts which have been permanently opened are indicated by the illumination of the appropriate lights or lamps.

SUMMARY OF THE INVENTION

According to the present invention, an industrial equipment operating status scanner is provided for recording the location and exact time of all switch/contact openings in an industrial machine or process. The scanner of the present invention also provides an indication as to whether the fault was intermittent or continuous. Thus, system fault diagnosis utilizing the scanner of the present invention is made simple and reliable, resulting in less down time and less loss of revenue to the owner of the industrial machine(s) or process.

The scanner of the present invention provides an indication firstly of whether or not the machine is operational, secondly, in the event of an intermittent problem, the scanner displays which input device is faulty, and thirdly, in the event that operation of the machine has been stopped, the scanner displays which input device caused it to stop. In addition to the foregoing, the scanner displays also which input is preventing the machine from starting again. The time and date of the fault is also displayed by the scanner of the present invention. Thus, the scanner provides monitoring of the status of a machine's circuits and diagnoses any faults. It also records the machine's running time as well as the down time, as discussed in greater detail below.

BRIEF DESCRIPTION OF THE DRAWINGS

A detailed description of the invention is provided below with reference to the following drawings, in which.

DETAILED DESCRIPTION OF THE PREFERRED EMBODIMENT

Figure 1:
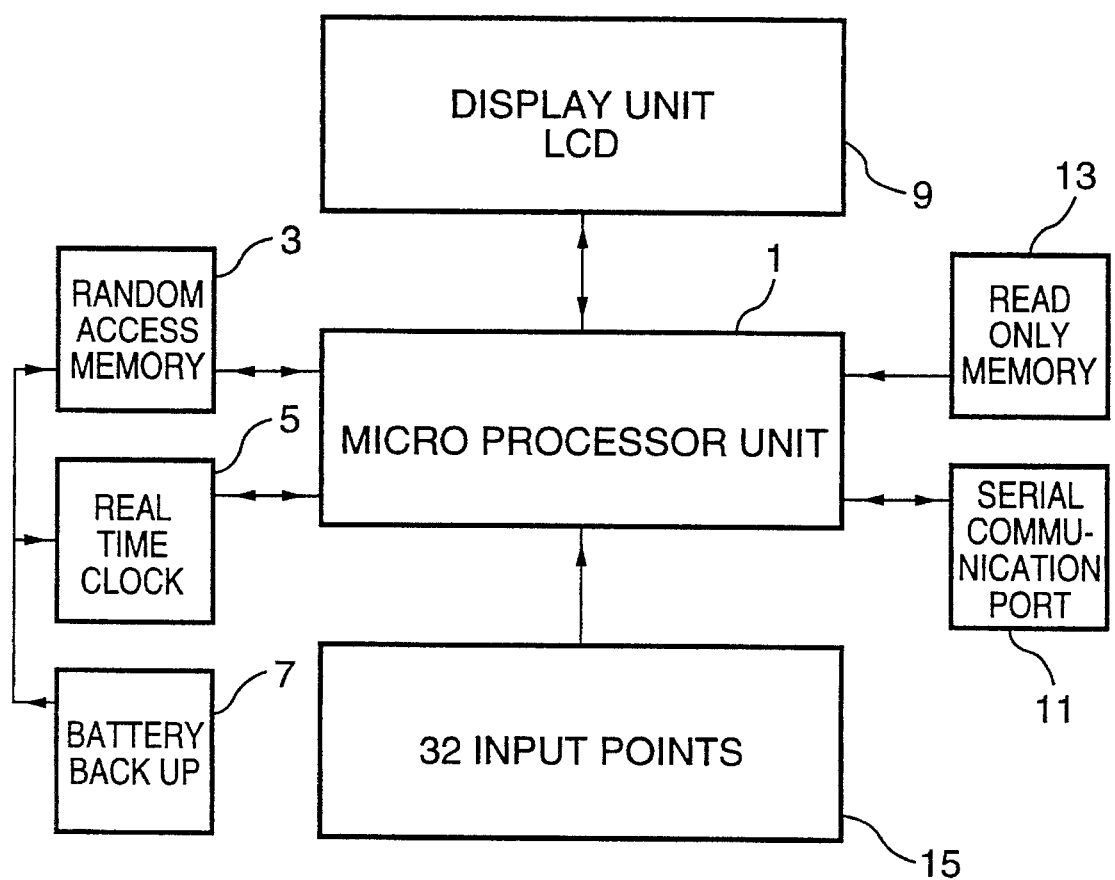
FIG. 1 is a system block diagram of the industrial equipment operating status scanner according to the present invention.

Turning to FIG. 1, the scanner according to the present invention is shown comprising a microprocessor unit 1 of well known design (e.g. typically a 16-bit microprocessor), connected to a random access memory 3, real time clock 5 and battery back-up 7 in a well known manner. Also connected to the microprocessor unit 1 is an LCD display unit 9, a serial communication port 11 (e.g. for connection to an external printer) and a read only memory 13 which stores executable code for the microprocessor unit 1. Thirty two input points 15 are scanned by the microprocessor unit 1 at a rate of approximately 20,000 samples per second. The thirty two input points 15 are preferably configured as a pair of 16 bit parallel ports.

Figure 2:
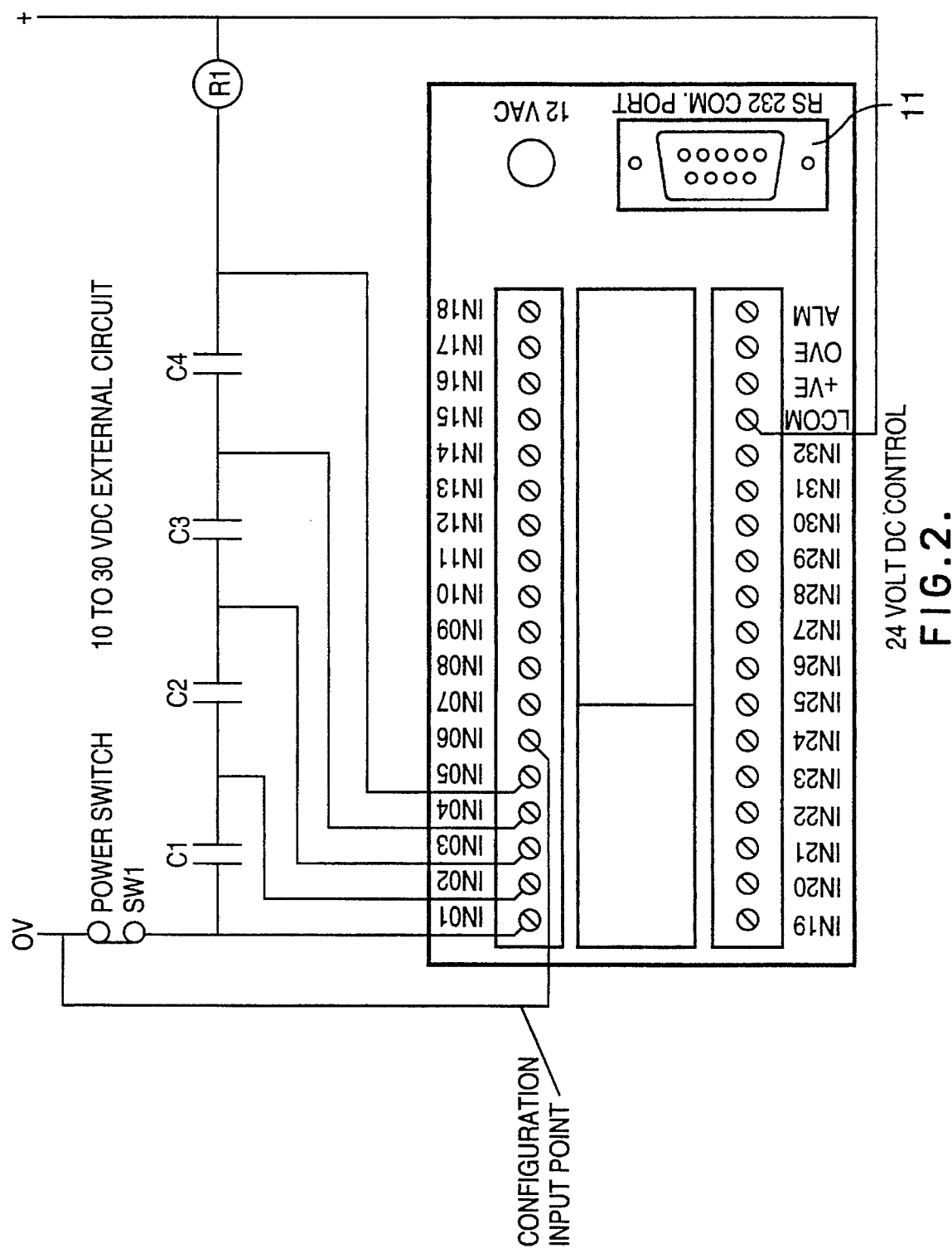
FIG. 2 shows a back panel of the scanner according to the present invention with connections shown schematically to a DC control circuit of a machine.

With reference to FIG. 2, there is illustrated a connection diagram of the scanner according to the present invention to a DC control circuit of a machine. The machine control circuit is provided with a power ON/OFF switch SW1, four contacts C1 to C4 and a relay R1. All of the switches and contacts SW1, C1, C2, C3 and C4, have to be closed in order to energize relay R1 for operating the machine. The thirty two input points 15 (FIG. 1) are identified on the back panel of the scanner (FIG. 2) by contact terminals IN01 to IN32. The scanner samples these terminal points in succession, beginning with IN01 and proceeding sequentially to IN32. In the configuration of FIG. 2, only terminals IN01 to IN06 are connected, where IN01 is the first terminal point being monitored and IN05 is the last terminal point of the machine being monitored. IN06 is a configuration point which is connected permanently to ground for identifying the previous input point (i.e. IN05) as being the last of the consecutive input points to be scanned. Thus, in the configuration of FIG. 2, the scanner identifies IN06 as being the configuration input point and thereafter samples only inputs IN01 to IN05 for machine circuit fault detection.

Input IN01 is connected to the power supply side of the machine control circuit. Thus, input IN01 provides an indication as to whether the power switch SW1 is ON or OFF. Input IN02 is connected to the C1 contact for providing an indication as to whether the contact C1 is open or closed. Likewise, inputs IN03 and IN04 are connected to contacts C3 and C4, respectively. Input IN05 is connected to the final point of the machine control circuit for indicating if the machine is operational.

Figure 3:
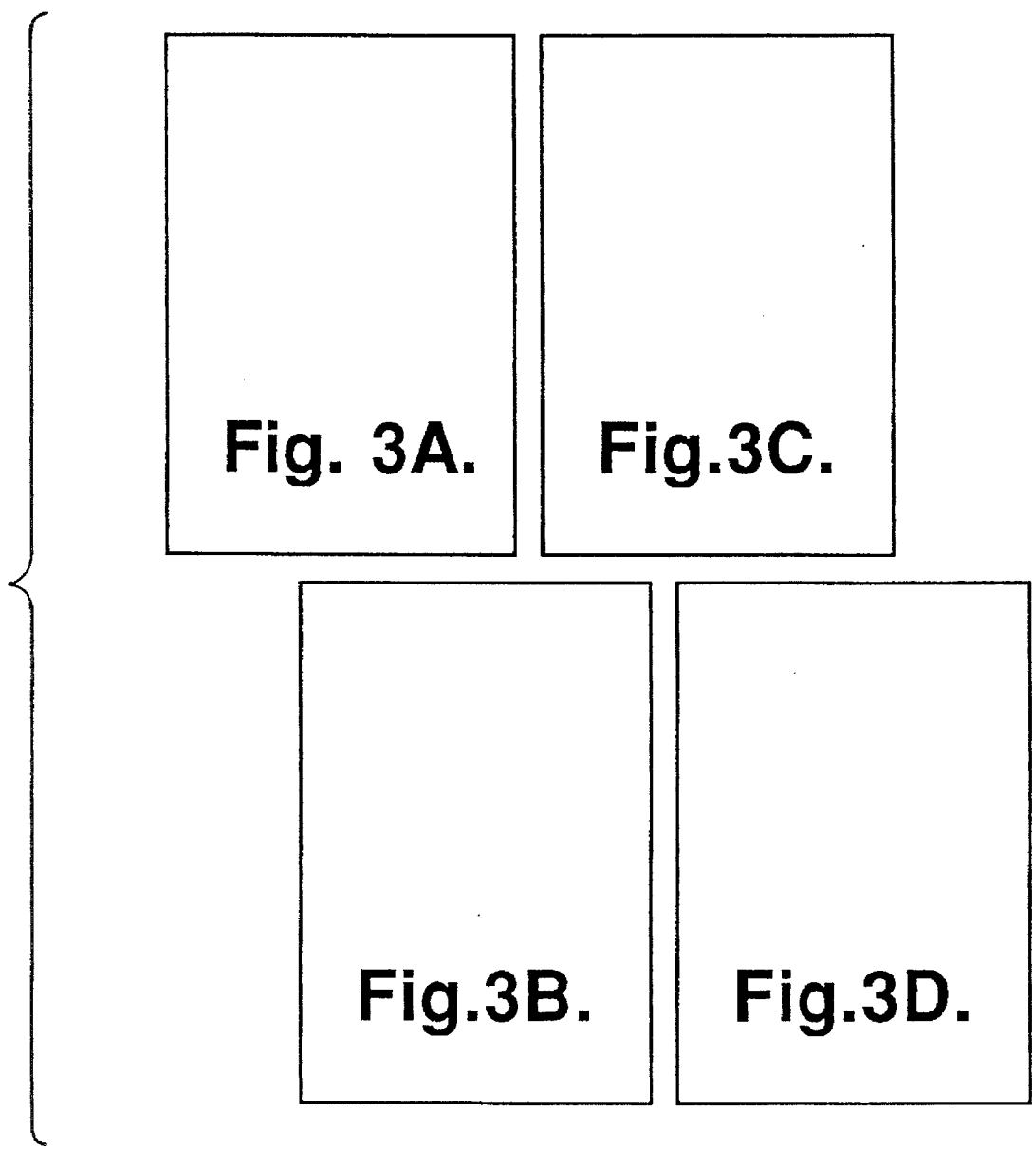
FIG. 3 which indicates the arrangement of FIGS. 3A, 3B, 3C and 3D that when combined are a flow chart showing operation of the scanner according to the preferred embodiment.
Figure 3A:
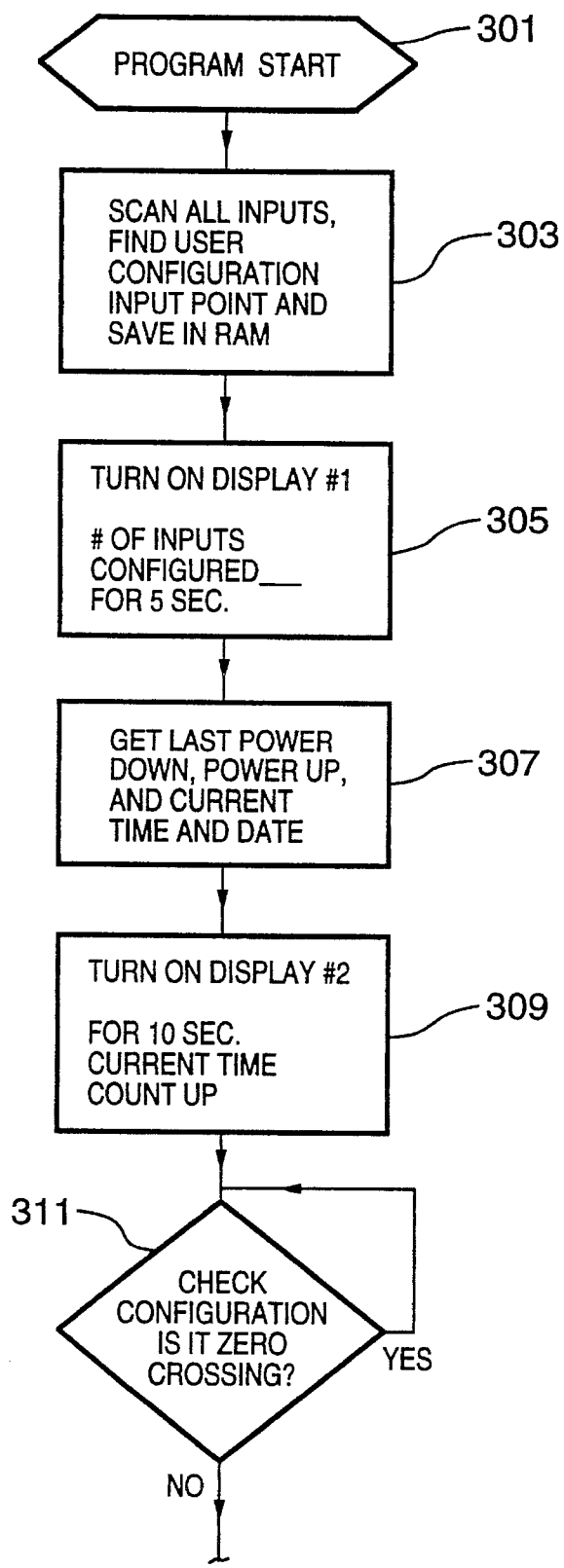
Figure 3B:
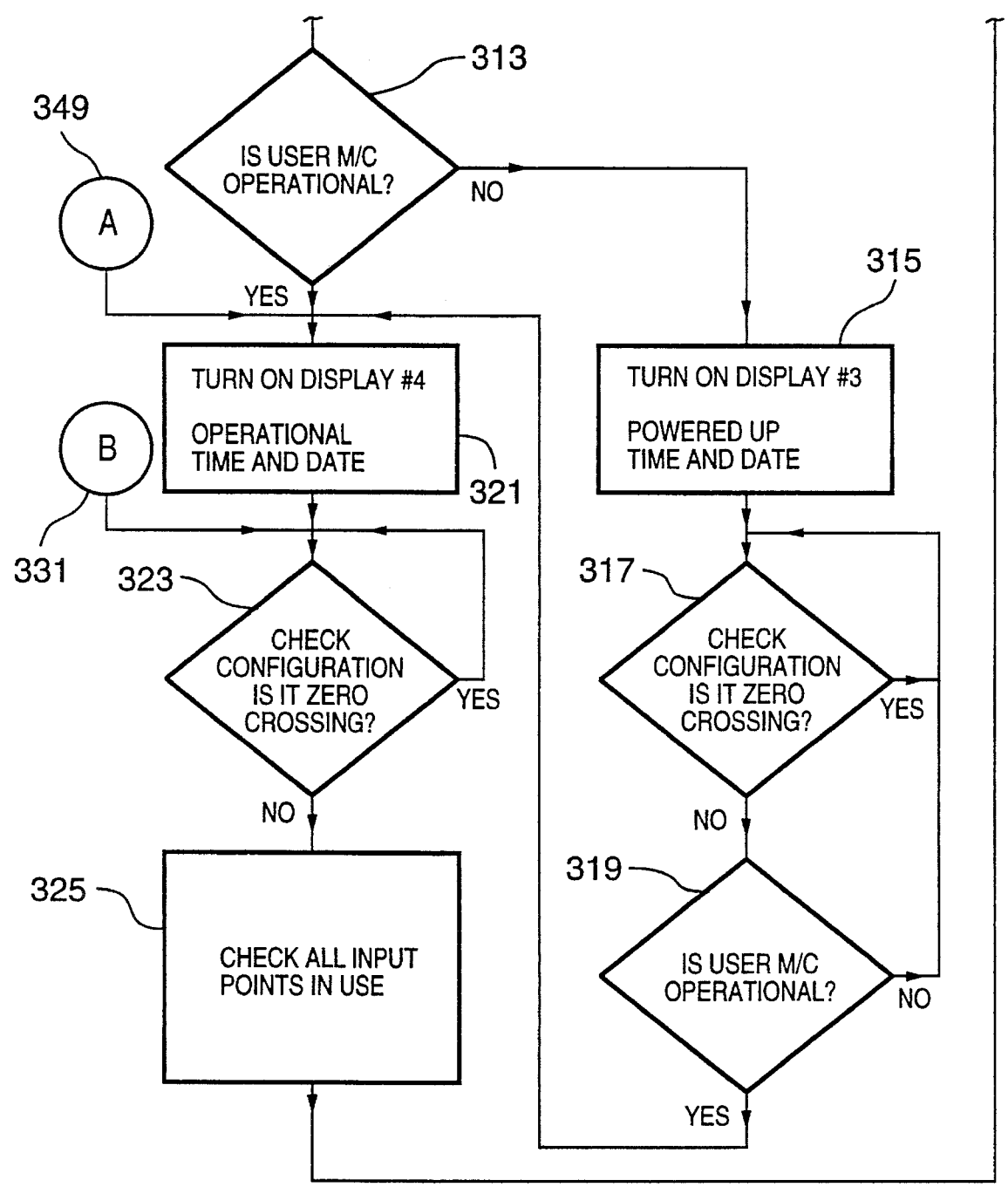
Figure 3C:
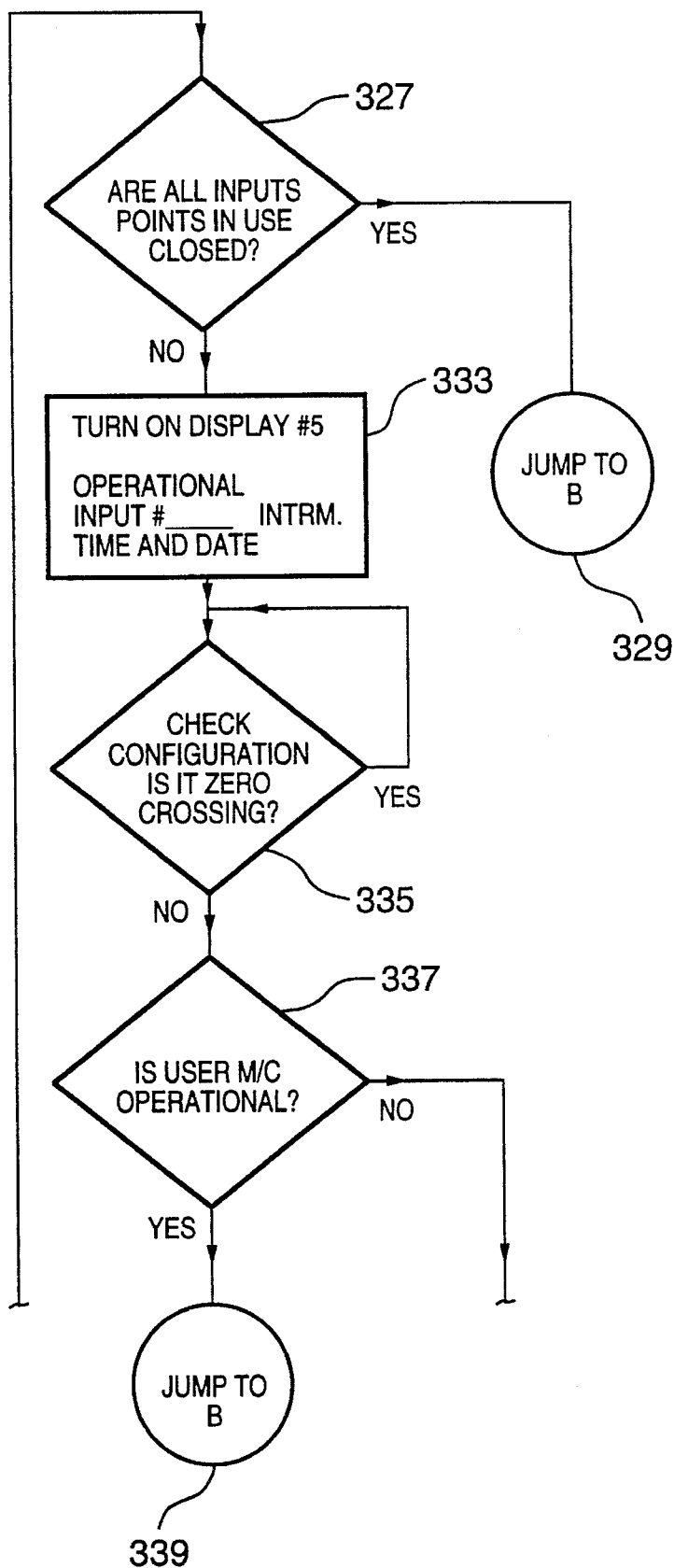
Figure 3D:
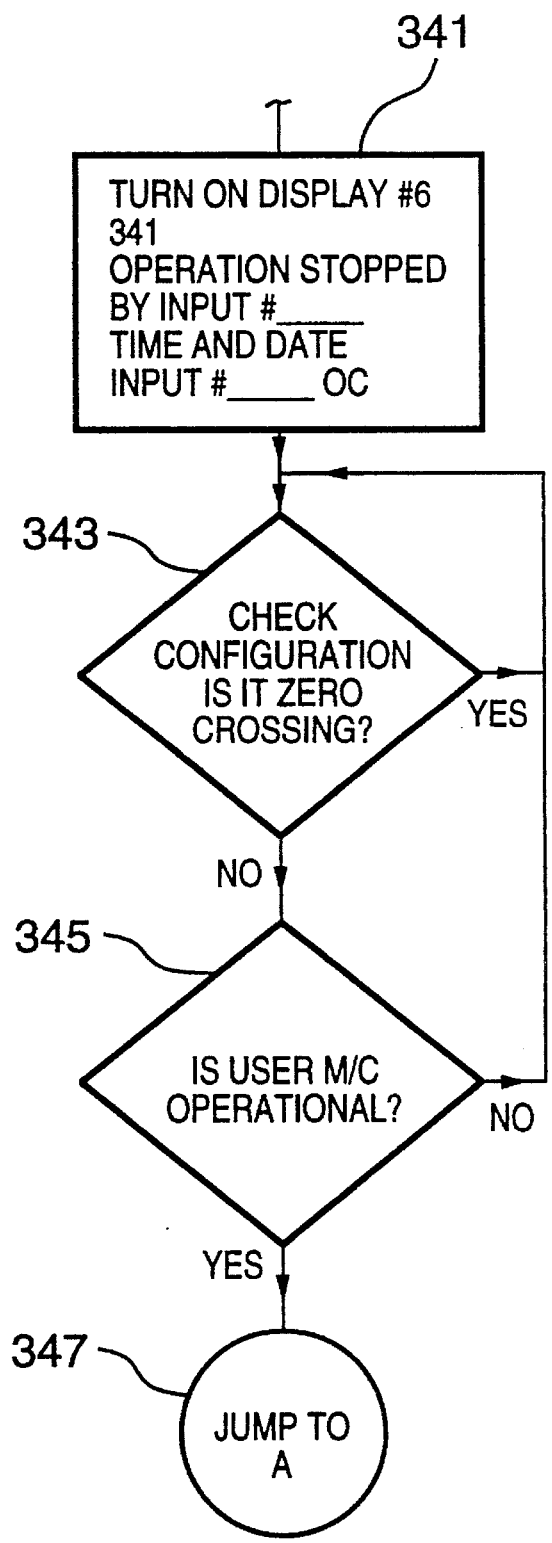

Turning now to the flow chart of FIG. 3 in combination with FIGS. 1 and 2, operation of the scanner is described in greater detail.

Upon powering up the scanner, microprocessor unit 1 (FIG. 1) begins executing software code stored in read only memory 13 for implementing the process shown in FIGS. 3A, 3B, 3C and 3D. Following program start (step 301) all of the thirty two input points 15 are scanned in order to locate the user configuration input point (i.e. input IN06 in the configuration of FIG. 2). Upon locating the user configuration input point, its value is saved in random access memory 3. This step is identified in FIG. 3 by reference numeral 303. Next, in step 305, microprocessor unit 1 causes LCD 9 to turn on "display #1" which indicates, for five seconds, the number of inputs configured. Display #1 appears as follows:

```
TOTAL INPUTS
CONFIGURED 5
```
Display #1

In step 307, the last or previous power down, power up and the current time and date are retrieved from random access memory 3. In step 309 this information is displayed on LCD 9 as "display #2":

```
Up    09:20:00  15-08-93
DN    08:00:00  15-08-93
TM    09:20:01  15-08-93
SAFE T SCAN VER 1.2
```
Display #2

With reference to Display #2, the time and date that the machine was powered up is indicated beside the letters "Up". The next line "DN" shows the time and date when the machine was last powered down. The third line "TM" shows the present time and date. This display is maintained for ten seconds.

In step 311, the system determines whether the voltage at the configuration input point is passing through a zero volt crossing, as discussed in greater detail below with reference to the alternative embodiment of FIGS. 5A, 5B and 6. In the DC control circuit embodiment of FIG. 2, the sampled voltages do not vary dynamically. Thus, this step is not necessary in the application of the present invention to such DC control circuits. If it is determined that the voltage on the configuration point is alternating and passing through a zero crossing (i.e. 0 volts) then step 311 is re-executed until the voltage on the configuration input point is no longer at zero volts (this step being required in the AC application of the present invention, discussed below with reference to FIG. 5A, 5B and 6).

In step 313, the scanner determines whether the machine or industrial process is operational, by testing the voltage at the last input point before the configuration point (ie. IN05 in FIG. 2). If the machine or process is determined to be operational, then program flow proceeds to step 321. If an open circuit is detected, indicating that the machine is not operational, the scanner determines which contact or switch is preventing the machine from operating (eg. a "start" button, etc.) and then generates display #3 (step 315) for indicating that the machine is powered up but is not operational:

```
POWERED UP
AT 09:20:00 15-08-93
INPUT # 3 OC
```
Display #3

Line 3 of Display #3 indicates that input number 3 is "open circuit" which is the cause of the machine being non-operational.

In step 317, the system again determines whether the voltage on the configuration input point is passing through a zero crossing. If it is, step 317 is re-executed. If the voltage on the configuration input point is not passing through a zero crossing, then, in step 319, the system determines whether the machine is yet operational. If it is not, steps 317 and 319 are re-executed. Otherwise, if the machine has become operational process control turns to step 321.

In step 321, the system generates Display #4, as follows:

```
OPERATIONAL
AT 18:34:30 15-08-93
```
Display #4

Display #4 indicates that the machine is operational and the second line of the display shows the current time and date.

In step 323, the system again checks the voltage on the configuration input point to determine whether it is passing through a zero crossing. If it is, step 323 is re-executed. If it is not, process control proceeds to step 325.

According to step 325, all of the configured inputs are scanned (e.g. in the embodiment of FIG. 2, inputs IN01–IN05 are scanned).

In step 327, the system determines whether or not all of the input points in use are closed. If all of the input points are closed (indicating no-fault operation of the machine), the software control jumps at step 329 back to step 323, via jump instructions 329 and 331.

However, in the event that at least one of the input points is open (i.e. a negative determination in step 327), Display #5 is generated at step 333 which shows that the machine is still operational, but that one of the inputs was intermittently opened. Display #5 appears as follows:

```
OPERATIONAL
AT 18:24:30 15-08-93
INPUT #01 INTRM.
AT 09:25:00 15-08-93
```
Display #5

In the third line of Display #5 an intermittent problem has been identified with input number 1. The fourth line shows the time and date that the fault occurred.

In step 335, the voltage on the configuration input point is again checked to determine whether it is passing through a zero crossing. If it is, then step 335 is re-executed. If it is not, the program proceeds to execute step 337.

In step 337, operation of the machine is again checked to determine whether it is operational (eg. by testing the voltage at IN05). If the machine is operational, jump instructions 339 and 331 are executed and the system control reverts to step 323.

However, if the machine is found to be non-operational in step 337, the scanner determines which of the contacts caused the machine to stop functioning (eg. an intermittent open circuit, or a permanent open circuit) as well as which switch is preventing the machine from re-starting (e.g. a "reset" or "start" switch which may need to be pushed to resume operation). The scanner then generates Display #6 in step 341. Display #6 is as follows:

```
OPERATION STOPPED
   by INPUT #2
 AT 18:42:15 15-08-93
    INPUT #3 OC
```
Display #6

The second line shows which input point caused the machine to stop (e.g. Input #2). The third line shows the time and date of stoppage. The fourth line shows which contacts on the machine are open-circuited, in ascending order. For example, in Display #6 input #3 is shown open-circuited, indicating that initially the machine is unable to re-start because of an open circuit at the device or contact monitored by input #3 (ie. there are no open circuit conditions at any of the inputs below IN03). Upon correcting the fault at the contact monitored by input #3, the machine may begin functioning again. Alternatively, if there is a further open circuit detected by any of the higher numbered inputs (ie. IN04 or IN05), upon correcting the fault at the device or contact connected to input #3 the fault at the higher numbered input will be displayed at line four of Display #6. Similarly, if while Display #6 indicates an open circuit at input #3, a lower numbered input detects an open circuit (eg. if IN02 is connected to a control cabinet door having a safety switch, and that door needs to be opened in order to access the contact or device connected to input #3), then Display #6 changes to indicate that the lower numbered input has detected an open circuit.

Operational control continues through step 343 in which the voltage on the configuration input point is again checked. If it is determined that the voltage on the configuration point is alternating and passing through a zero crossing (i.e. zero volts), then step 343 is re-executed until the voltage on the configuration input point is no longer at zero volts. If the voltage on the configuration input point is not passing through a zero crossing, the program flow proceeds to step 345. In step 345, a determination of machine operability is made, and finally jump instruction 347 is executed to step 349 in the event that the machine continues to be operational. If the machine is not operational, steps 343 and 345 are re-executed.

Thus, according to one unique aspect of the present invention, the machine control circuit is analyzed for the detection of intermittent problems (e.g. faulty device, bad or intermittent contact, loose connection, broken wire or any faulty input device). These intermittent faults are displayed as "INPUT #_INTRM" along with the time and date of the fault. This information allows the operation or maintenance personnel to identify a potential problem even before the faulty device causes the machine to stop.

Returning to FIG. 1, the information on LCD 9 may also be transmitted via serial communication port 11 to a printer, in a well known manner. Alternatively, the information may be displayed on a terminal screen which is integrated as part of the industrial machine(s) or process.

Figure 4:
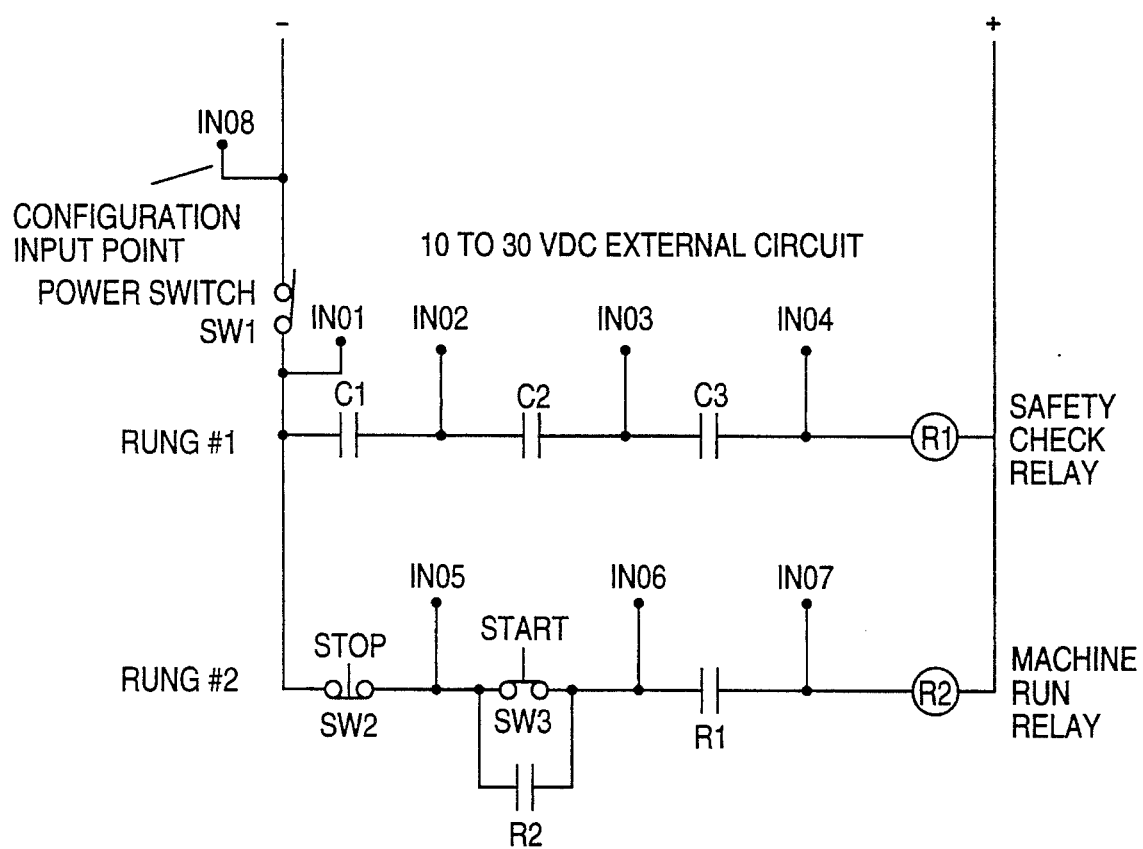
FIG. 4 shows connection points of the scanner according to the present invention to another typical machine control circuit.

Turning briefly to FIG. 4, another example of a typical machine control circuit is provided. Switch SW1 is a power ON/OFF switch. In Rung #1, contacts C1, C2 and C3 are device contacts of the machine and R1 is a safety check relay. In Rung #2, switch SW2 acts as a machine stop button, switch SW3 acts as a machine start button, and R1 is the contact of the safety check relay in Rung #1.

Figure 5:
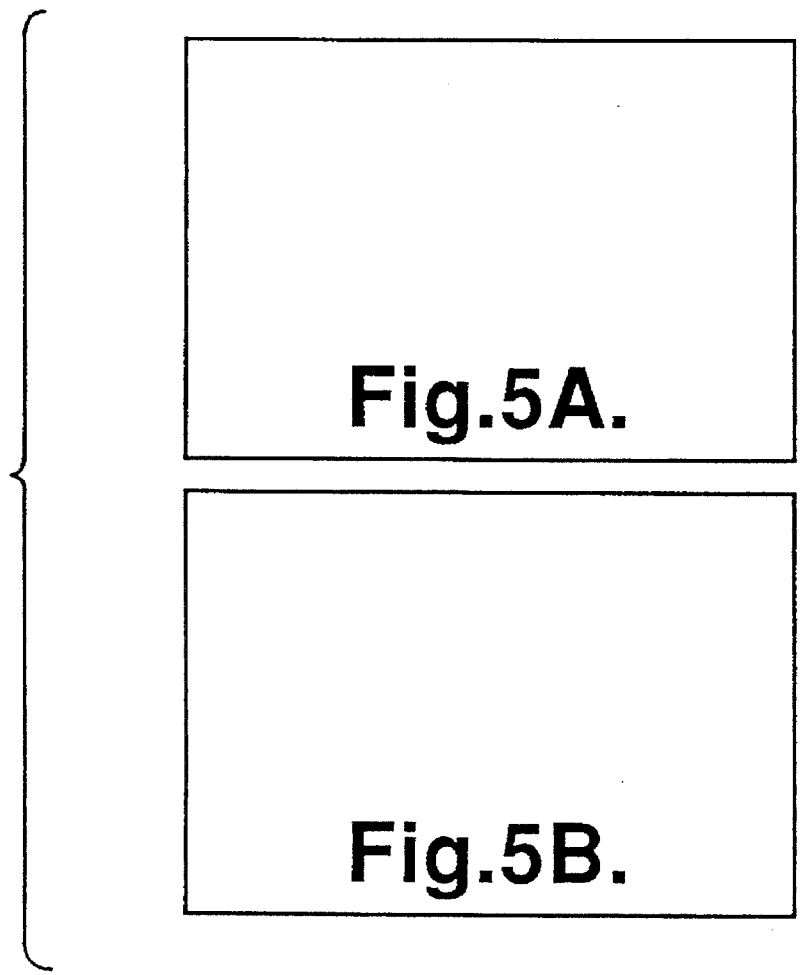
FIG. 5 which indicates the arrangement of FIGS. 5A and 5B that when combined shows connection of the scanner according to the present invention to an AC machine control circuit via a plurality of interface relays according to an alternative embodiment of the invention.

Device contacts C1, C2, and C3 must be closed in order to energize relay R1. When the operator closes the start push button SW3, the machine run relay R2 energizes and puts the machine in the run mode. As shown in FIG. 5, input points IN01 to IN08 of the scanner are all connected across respective rungs of the contact switches and relays in order to monitor the complete status of machine operation.

As is clear from FIGS. 2 and 4, the scanner of the present invention may be connected to machine DC control circuits in a simple manner. According to an alternative embodiment of the invention, the scanner may also be connected to AC control circuitry operating on 120 volts AC via a plurality of interface relays 61, as illustrated in FIGS. 5A and 5B.

Figure 5A:
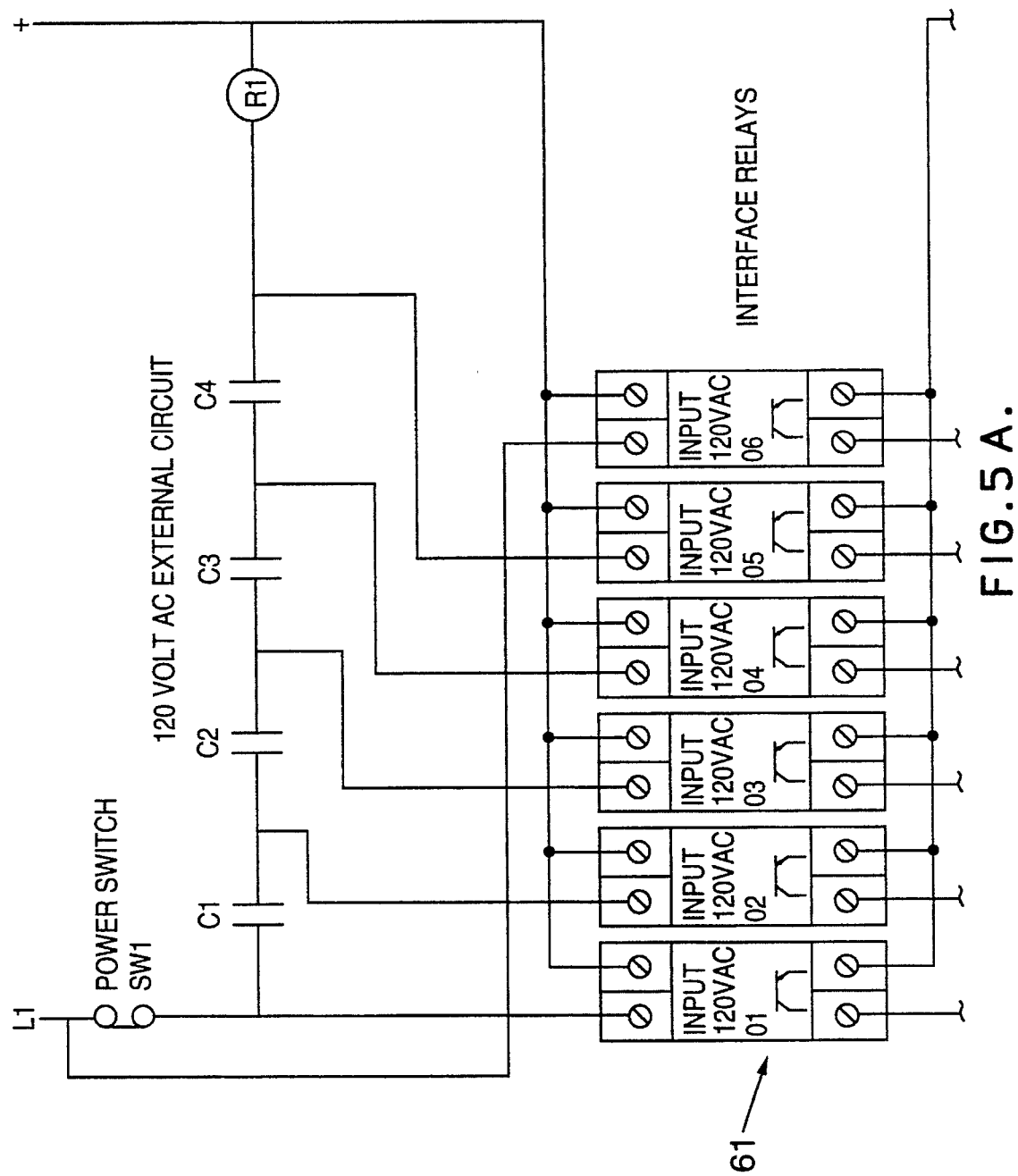
Figure 5B:
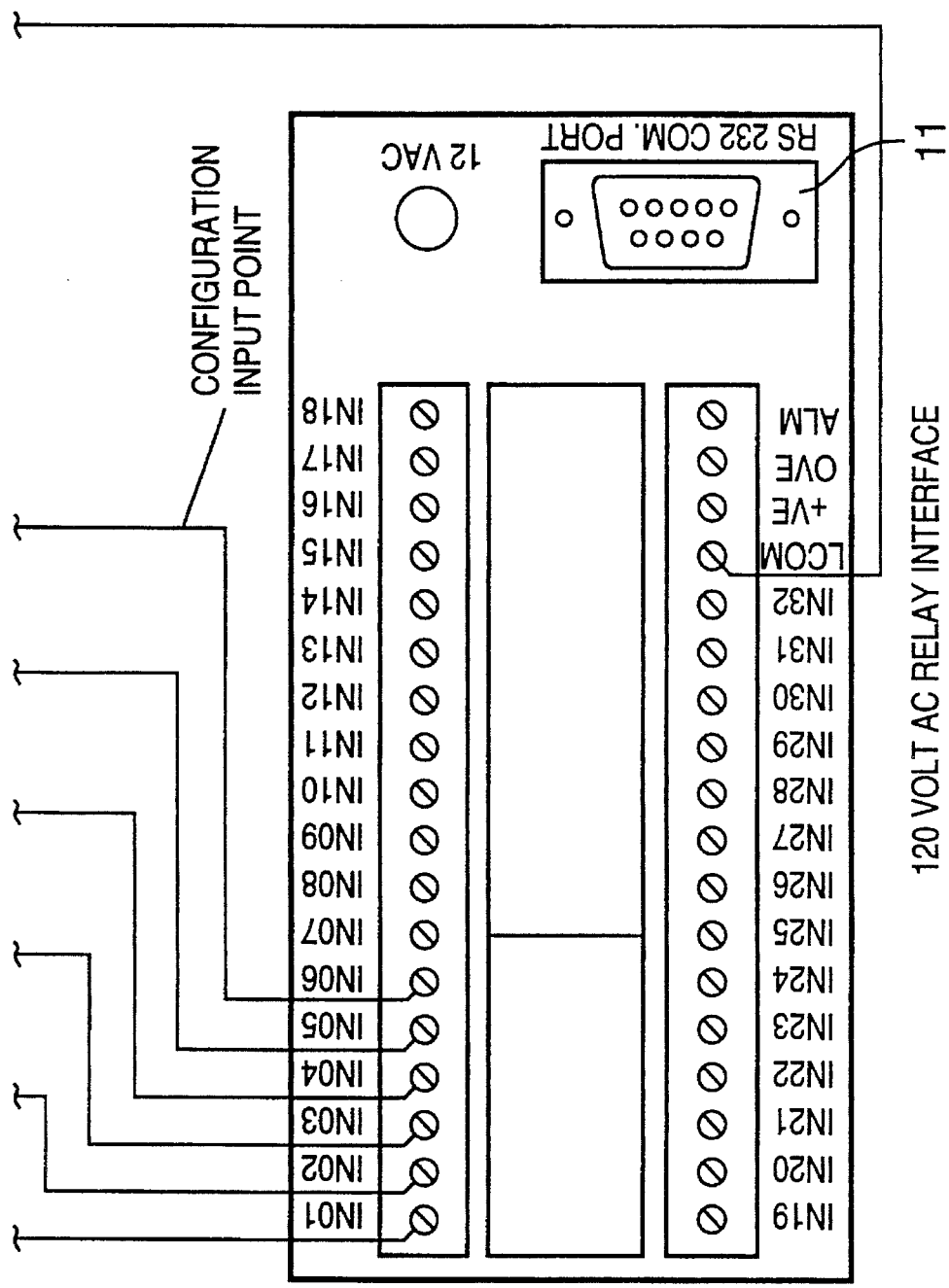

The embodiment of FIGS. 5A and 5B is similar to the embodiment of FIG. 2 in terms of the respective connections between input terminals IN01–IN05 and machine control points SW1 to C4. However, the AC interface relays 61 are placed intermediate these connections. The interface relay 06, shown connected to input IN06 and to the configuration point of the 120 volt AC control circuit (e.g. power line L1), is used for detecting the AC voltage zero crossing point. As discussed above, in a DC machine control circuit, the scanner of the present invention determines that the configuration input is grounded (or at a DC common level) at all times due to the DC voltage level being steady. However, in an AC machine control circuit such as shown in FIGS. 5A and 5B, the scanner determines that the configuration input point switches from ON to OFF due to the alternating current sine wave on line L1. In this type of circuit, the scanner scans all input points in use only during the AC voltage ON cycle, and stops scanning during the zero crossings of the AC circuit (i.e. steps 311, 317, 323, 335 and 343 in FIGS. 3A, 3B, 3C and 3D).

Figure 6:
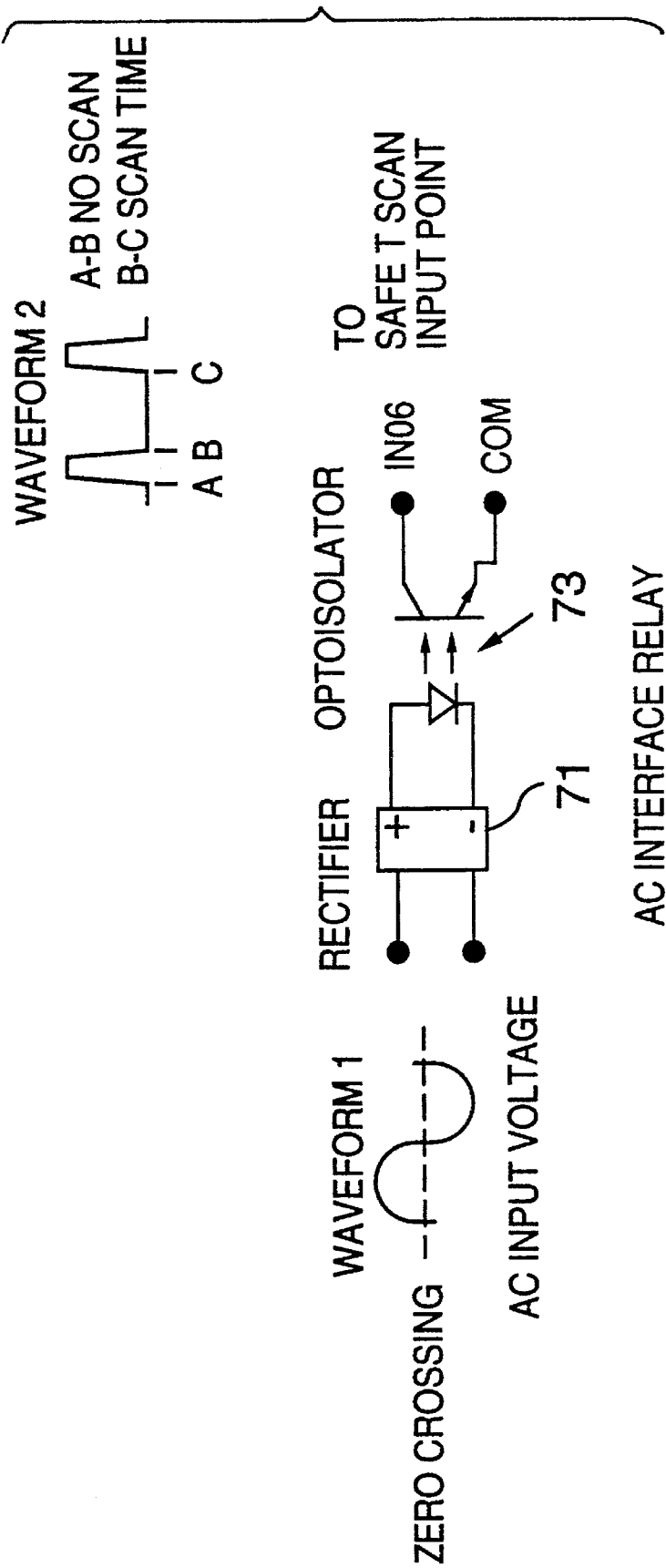
FIG. 6 shows a schematic diagram and wave form diagram of a typical interface relay according to the alternative embodiment.

Turning to FIG. 6, the AC input voltage is shown as being a sine wave which is rectified via a rectifier 71 to a DC voltage which is then fed to an optoisolator device 73. The output from the optoisolator 73 is connected to the appropriate input point (i.e. IN01 to IN32) of the scanner. The scanner monitors the configured input points in the manner discussed above with reference to FIGS. 3A, 3B, 3C and 3D, and checks for zero crossings of the AC voltage on the configuration input point such that during the time A to B of output waveform 2 (i.e. the waveform across IN06 and circuit common COM, IN06 being connected internally within the scanner to +5 V through a pull-up resistor), the input waveform is seen to be passing through a zero crossing so that the scanner stops scanning the input points (i.e. program execution loops around steps 311, 317, 323, 335 or 343). During the time B to C shown in waveform 2, the scanner detects that the voltage on the configuration input point is no longer in a zero crossing, and all the remaining configured input points are scanned.

Thus, according to the embodiment of FIGS. 5A, 5B and 6, the zero crossing of the AC voltage signal is "blanked" so that the scanner does not indicate a false "open" reading of the remaining inputs in the control circuit due to the AC sine wave passing through a zero crossing. Also, the optoisolator 73 provides isolation of the 120 volts power from the logic level voltage circuits of the scanner (FIG. 1).

Figure 7:
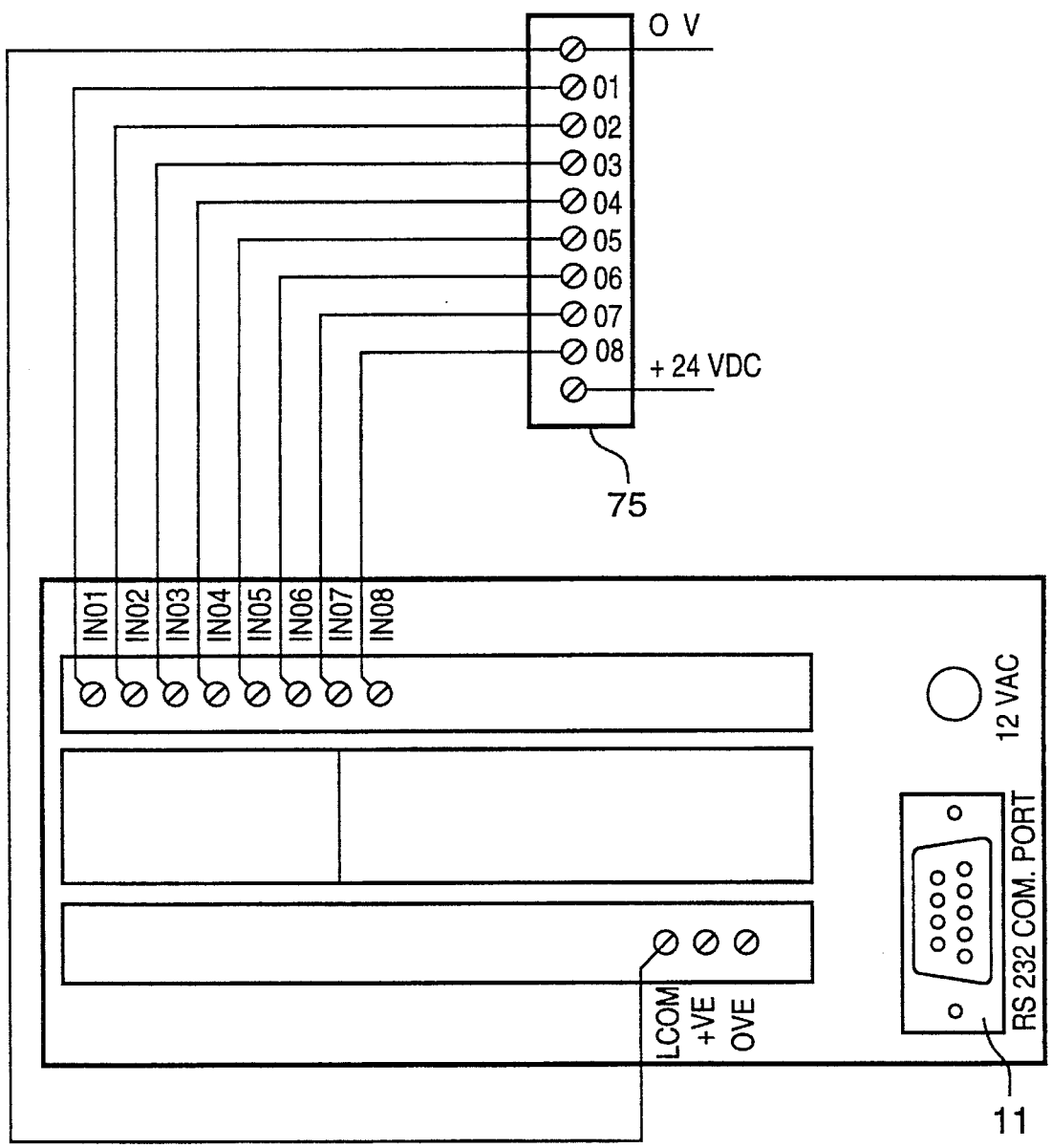
FIG. 7 shows connection of the scanner of the present invention connected to a programmable logic control circuit according to a further alternative embodiment.

Turning now to FIG. 7, the scanner of the present invention is shown connected to an output module of a programmable logic controller 75, a (PLC), for converting voltages on a plurality of machine terminal points (AC or DC machine) to a binary value indicative either of proper operation or a system fault. In the case of a fault, the binary value output from PLC module 75 provides an indication of which terminal point is faulty, as discussed in greater detail below.

The PLC module 75 has a plurality of inputs (not shown) connected to respective ones of the terminal points (eg. 15 terminal points) and a plurality of outputs (eg. eight outputs 01–08) connected to respective inputs of the scanner (eg. IN01–IN08). A user can program the PLC 75 in such a way as to define the PLC logic to detect a predetermined number of machine operating points. The programming and operation of the PLC is well known in the art and beyond the present disclosure.

The scanner reads the (eg. 8 bit) binary value from the output module 75 and displays the status of the machine on the LCD screen 9. For the configuration shown in FIG. 7, it is clear that the number of inputs that can be sensed is 256 (8 bit binary value).

In operation, for example, with the scanner preconfigured to sense 15 inputs, the outputs 01, 02, 03, and 04 from PLC module 75 will each be at a logic "1" (resulting in a hex value F) meaning the machine is operational. If the machine experiences a fault, the output (eg. hex value) from the module 75 changes to a lower number indicating which terminal point is experiencing the fault. For example, if the fifth terminal point is at a logic low level, the outputs 01, 02, 03 and 04 change from 1111 to 0101, the scanner detects this binary value on outputs IN01–IN04, and causes display 9 to indicate that the "number 5" switch or contact has stopped the machine.

As indicated above, from the machine operating mode, the scanner of the present invention captures a change in output value from PLC 75 and displays the number of the input that caused the machine to stop. This fault is displayed on LCD screen 9 as specified in Display #6 discussed above. The second line of Display #6 shows which input point caused the machine to stop (e.g. input #5). The third line shows the time and date of stoppage. The fourth line shows which contact or device on the machine is open-circuited in ascending order (i.e. which contact or device is preventing the machine from starting again).

The scanner of the present invention can also be interfaced with the PLC 75 through serial port 11 (ie. RS232 com port) to read machine status.

Other applications of the invention are possible. For example, instead of measuring open circuit conditions of switches and contacts in an industrial machine, the scanner of the present invention may be utilized to detect flicker and power failures in hydroelectric power lines, using the principles discussed above (ie. power flicker is detected as an intermittent open circuit condition, while power failure is detected as a complete open circuit condition). In this application, the scanner should be powered by an uninteruptble power supply (UPS).

Other embodiments of the invention are possible. For example, input numbers to the scanner can be edited to display particular actual user device labels. (e.g. limit switch number 2 can be edited to read LIMIT SW2 on the display). In this variation the microprocessor unit 1 reads the input number and then reads a lookup table to obtain the edited label. If no label is edited, the program defaults to the input number.

All such embodiments and other equivalents are believed to be within the sphere and scope of the invention as defined by the claims appended hereto.

I claim:

1. A fault status scanner for detecting fault conditions at any of a plurality of control circuit contacts and switches of an electric machine, comprising:
   a) a plurality of inputs predetermined ones of which are connected in succession to respective ones of said contacts and switches, and a last one of said predetermined inputs in said succession being connected to a configuration point of said electric machine having a known predetermined voltage;
   b) means for scanning said plurality of inputs for said known predetermined voltage thereby identifying said last one of said inputs in said succession;
   c) means for scanning said predetermined ones of said inputs connected in said succession for occurrences of open circuit conditions, and
      i) in the event of detection of no open circuit conditions then displaying a message indicating that said machine is operational;
      ii) in the event of detection of an intermittent open circuit condition on one of said predetermined ones of said inputs displaying a message indicating that said machine is operational and that said intermittent open circuit condition has occurred on said one of said predetermined ones of said inputs; and
      iii) in the event of a non-intermittent open circuit condition on one of said predetermined ones of said inputs displaying a message indicating that said machine is not operational due to a non-intermittent open circuit condition on said one of said predetermined ones of said inputs and displaying any other open circuit conditions on any other of said predetermined ones of said inputs in ascending order of said inputs.

2. The fault status scanner of claim 1, further comprising means for limiting said scanning of said predetermined ones of said inputs to times when said known predetermined voltage on said configuration point is non-zero.

3. The fault status scanner of claim 1, further comprising means for displaying a configuration value corresponding to the number of said inputs connected in said succession minus one.

4. The fault status scanner of claim 1, further including a programmable logic control means intermediate respective ones of said predetermined inputs and said contacts and switches, for generating a binary value representing voltages on said input points, and means for receiving said binary value and in response determining one of either the existence or absence of said occurrences of open circuit conditions and generating one of either i) said message indicating that said machine is operational, ii) said message indicating that said machine is operational and that said intermittent open circuit condition has occurred on said one of said predetermined ones of said inputs, or iii) said message indicating that said machine is not operational due to a non-intermittent open circuit condition on said one of said predetermined ones of said inputs and displaying any other open circuit conditions on any other of said predetermined ones of said inputs in ascending order of said inputs.

5. The fault status scanner of claim 1, further comprising a plurality of interface relays intermediate respective ones of said predetermined inputs and said contacts and switches, for AC operation of said electric machine.

6. The fault status scanner of claim 3, wherein each of said interface relays comprises a rectifier connected to one of said contacts and switches and an optoisolator having an input connected to said rectifier and an output connected to one of said predetermined inputs.

7. A method of detecting fault conditions at any of a plurality of control circuit contacts and switches of an electric machine connected to a power supply, comprising steps A) to N) as follows:

A) detecting voltage at said power supply and in the event said voltage is zero continuing to detect said voltage at said power supply, and in the event said voltage is non-zero then executing step B);

B) scanning voltages across said contacts and switches to detect whether said machine is operational, and in the event said machine is operational then executing step C) and in the event said machine is not operational then executing step D);

C) displaying a message indicating that said machine is operational and then executing step G);

D) displaying a message indicating that said machine is powered up and then executing step E);

E) detecting voltage at said power supply and in the event said voltage is zero continuing to detect said voltage at said power supply, and in the event said voltage is non-zero then executing step F);

F) scanning voltages across said contacts and switches to detect whether said machine has become operational, and in the event said machine is operational then executing step G) and in the event said machine is not operational then executing step C);

G) detecting voltage at said power supply and in the event said voltage is zero continuing to detect said voltage at said power supply, and in the event said voltage is non-zero then executing step H);

H) scanning voltages across said contacts and switches to determine whether all of said contacts and switches are closed, and in the event all of said contacts and switches are closed then executing step G), and in the event one of said contacts and switches is open then executing step I);

I) displaying a message indicating that said machine is operational and that an intermittent open circuit has occurred at said one of said contacts and switches, and then executing step J);

J) detecting voltage at said power supply and in the event said voltage is zero continuing to detect said voltage at said power supply, and in the event said voltage is non-zero then executing step K);

K) scanning voltages across said contacts and switches to detect whether all of said contacts and switches are closed, and in the event all of said contacts and switches are closed then executing step G), and in the event one of said contacts and one of said switches is open then executing step L);

L) displaying a message indicating that operation of said machine has been stopped by said one of said contacts and that said one of said switches is open circuit, and then executing step M);

M) detecting voltage at said power supply and in the event said voltage is zero continuing to detect said voltage at said power supply, and in the event said voltage is non-zero then executing step N); and N) scanning voltages across said contacts and switches to detect whether said machine is operational, and in the event said machine is operational then executing step C) and in the event said machine is not operational then executing step M).

* * * * *